Aug. 31, 1926.

1,598,276

J. GOLDSCHMIDT

DIRECTION INDICATOR FOR MOTOR VEHICLES

Filed Dec. 28, 1925

Inventor:
Julius Goldschmidt
by
attorney

Patented Aug. 31, 1926.

1,598,276

UNITED STATES PATENT OFFICE.

JULIUS GOLDSCHMIDT, OF CASSEL, GERMANY.

DIRECTION INDICATOR FOR MOTOR VEHICLES.

Application filed December 28, 1925, Serial No. 78,059, and in Germany July 17, 1925.

This invention relates to a direction indicator of the kind used on motor vehicles and composed of an indicator arm which is controlled by means of a Bowden wire.

In the usual devices of this kind the indicator arm is supported in its horizontal position direct by the Bowden wire, and the strength of the latter is not always equal to the stress to which it is subjected when the arm sways under the jerks of the travelling vehicle.

The object of the present invention is to relieve the Bowden wire of excessive stress, and the invention consists in arranging the abutment for the outer Bowden element so that it changes its position under the stress, and adapting it to act as a latch for locking the arm in operated position.

Figure 1:
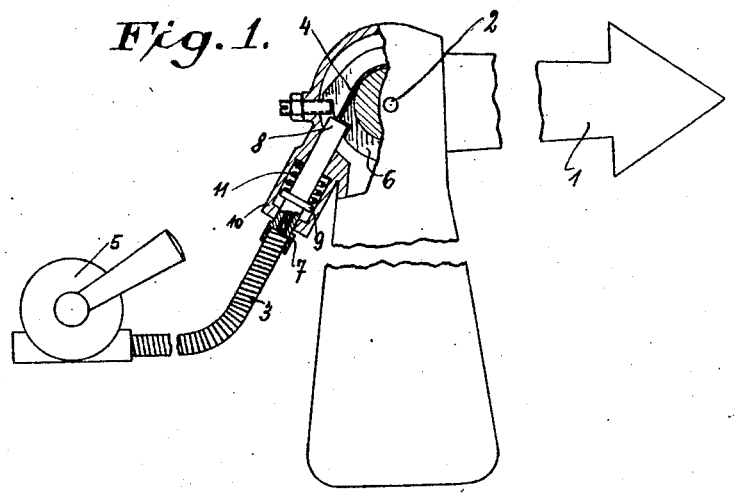
Figure 2:
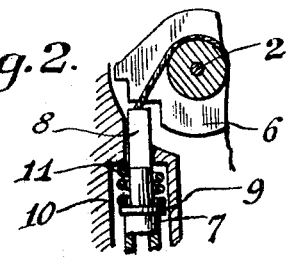

The invention is illustrated in the accompanying drawing in which Figure 1 represents a side view of the device, partly in section, and Figure 2 is a detail view showing features of construction.

The indicator arm 1 is adjustable about a shaft 2 and is operated by means of a sheave 6 and a Bowden wire 4 which turns the sheave together with the arm. The Bowden wire is controlled in the usual manner by means of a lever and a drum contained in a casing 5, and it is guided in a flexible tube 3.

According to the invention, the abutment 7 for the tube 3 is arranged to slide in a casing 10 and adapted to act as a latch for locking the arm 1 in the horizontal position. For this purpose the sheave 6 is formed with a notch for engagement with the inner end 8 of the abutment 7. A spring 11, which bears against a collar 9 on the abutment, holds the latter normally out of engagement with the sheave. On the arm 1 being turned into the horizontal, operative position, pressure is exerted by the tube 3 on the abutment 7, and this pressure finally overcomes the pressure of the spring 11 and allows the latch 8 to enter into engagement with the notch in the sheave 6. The latch is locked in this position by the usual engagement of the operating lever with the casing 5, and the turning moment of the arm will be supported by the latch instead of the wire. Overstraining of the latter will thus be effectively prevented.

As soon as the wire tension is relieved, the latch 8 is retracted by the spring 11 so as to allow the indicator arm to drop.

The device may be modified to suit different conditions of employment.

I claim:—

1. In a direction indicator, the combination with an indicator arm, a Bowden wire for operating said arm, and a tube for guiding said wire, of a slidable abutment for said tube, and means operated by said abutment under the pressure of the tube for locking the indicator arm in operated position.

2. In a direction indicator, the combination with an indicator arm, a Bowden wire for operating said arm, and a tube for guiding said wire, of a notched sheave controlling said arm, and a slidable abutment arranged so as to support the tube and so as to move under the pressure of the latter into engagement with the notched sheave for locking the latter and the indicator arm in operated position.

3. The structure claimed in claim 1 and a spring arranged so as to support the abutment and retract it from the sheave when the wire tension is relieved.

JULIUS GOLDSCHMIDT.